US012569912B2

(12) United States Patent
Schwarze

(10) Patent No.: US 12,569,912 B2
(45) Date of Patent: Mar. 10, 2026

(54) SYSTEM FOR USE IN AN APPARATUS FOR PRODUCING A THREE-DIMENSIONAL WORKPIECE USING AN ADDITIVE LAYER MANUFACTURING TECHNIQUE AND CORRESPONDING CONTROL UNIT AND METHOD

(71) Applicant: Nikon SLM Solutions AG, Luebeck (DE)

(72) Inventor: Dieter Schwarze, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 880 days.

(21) Appl. No.: 17/633,311

(22) PCT Filed: Sep. 14, 2020

(86) PCT No.: PCT/EP2020/075605
§ 371 (c)(1),
(2) Date: Feb. 7, 2022

(87) PCT Pub. No.: WO2021/063659
PCT Pub. Date: Apr. 8, 2021

(65) Prior Publication Data
US 2022/0193773 A1 Jun. 23, 2022

(30) Foreign Application Priority Data
Sep. 30, 2019 (DE) ..................... 10 2019 126 330.1

(51) Int. Cl.
*B22F 10/366* (2021.01)
*B22F 10/28* (2021.01)
(Continued)

(52) U.S. Cl.
CPC ............ *B22F 10/366* (2021.01); *B22F 10/28* (2021.01); *B22F 12/43* (2021.01); *B22F 12/49* (2021.01);
(Continued)

(58) Field of Classification Search
CPC ........ B22F 10/366; B22F 12/49; B22F 12/70; B22F 12/43; B22F 12/90; B22F 10/28; B33Y 30/00; B33Y 50/02; B33Y 10/00
(Continued)

(56) References Cited

U.S. PATENT DOCUMENTS

| 2016/0279706 A1 | 9/2016 | Donrose et al. | |
| 2017/0361405 A1* | 12/2017 | Renz .................... | B23K 26/705 |

(Continued)

FOREIGN PATENT DOCUMENTS

| CN | 1135731 | 11/1996 |
| CN | 1135732 | 11/1996 |

(Continued)

OTHER PUBLICATIONS

International Search Report and Written Opinion for PCT/EP2020/075605, European Patent Office, Sep. 30, 2019.

(Continued)

*Primary Examiner* — Steven W Crabb
*Assistant Examiner* — Dilnessa B Belay
(74) *Attorney, Agent, or Firm* — Williams Mullen; Thomas F. Bergert

(57) ABSTRACT

We describe a system for use in an apparatus for producing a three-dimensional workpiece using an additive layer manufacturing technique, the system comprising: an irradiation unit configured to selectively irradiate an irradiation plane with an irradiation beam, and a control unit coupled to the irradiation unit and configured to control the irradiation unit to modulate, as a function of a local process parameter (Continued)

when producing the three-dimensional workpiece, an irradiation beam property of the irradiation beam.

13 Claims, 2 Drawing Sheets

(51) Int. Cl.

| | |
|---|---|
| *B22F 12/43* | (2021.01) |
| *B22F 12/49* | (2021.01) |
| *B22F 12/90* | (2021.01) |
| *B33Y 10/00* | (2015.01) |
| *B33Y 30/00* | (2015.01) |
| *B33Y 50/02* | (2015.01) |

(52) U.S. Cl.
CPC .............. *B22F 12/90* (2021.01); *B33Y 30/00* (2014.12); *B33Y 50/02* (2014.12); *B33Y 10/00* (2014.12)

(58) Field of Classification Search
USPC ......................................................... 219/121
See application file for complete search history.

(56) References Cited

U.S. PATENT DOCUMENTS

| | | | |
|---|---|---|---|
| 2018/0141160 A1 | 5/2018 | Karp et al. | |
| 2019/0299291 A1* | 10/2019 | Domrose | .............. B23K 15/02 |
| 2021/0122117 A1* | 4/2021 | Schade | ................ B29C 64/371 |

FOREIGN PATENT DOCUMENTS

| | | |
|---|---|---|
| CN | 1976800 | 6/2007 |
| CN | 109996639 X | 7/2019 |
| DE | 69411280 | 11/1998 |
| DE | 102011087374 | 5/2013 |
| DE | 102013205724 | 10/2014 |
| DE | 102016120244 | 4/2018 |
| DE | 102018200721 | 7/2019 |
| DE | 102018200721 A1 * | 7/2019 |
| EP | 2942132 | 11/2015 |
| EP | 3170593 | 5/2017 |
| EP | 3597405 | 1/2020 |
| JP | 2018080393 | 5/2018 |
| JP | 2018130764 | 8/2018 |
| JP | 2019085641 | 6/2019 |
| JP | 2019142015 | 8/2019 |
| JP | 2019155914 | 9/2019 |
| WO | 2017132664 | 8/2017 |
| WO | 2019141410 | 7/2019 |

OTHER PUBLICATIONS

Search Report for German Patent Application No. 10 2019 126 330.1, German Patent and Trademark Office, Sep. 7, 2020.
Japanese Patent Office, Japanese Examination Report for JP Patent Application No. 2022-518713, Dec. 15, 2022.
China National Intellectual Property Administration, Chinese Examination Report for International Patent Application No. 202080067748. 7, Sep. 21, 2023.

* cited by examiner

SYSTEM FOR USE IN AN APPARATUS FOR PRODUCING A THREE-DIMENSIONAL WORKPIECE USING AN ADDITIVE LAYER MANUFACTURING TECHNIQUE AND CORRESPONDING CONTROL UNIT AND METHOD

CROSS-REFERENCE TO RELATED APPLICATIONS

This application is the U.S. national phase of international application PCT/EP2020/075605 filed on Sep. 14, 2020, which claims the benefit of German application DE 10 2019 126 330.1 filed on Sep. 30, 2019; all of which are hereby incorporated herein in their entireties by reference.

The present invention generally relates to a system for use in an apparatus for producing a three-dimensional workpiece using an additive layer manufacturing technique, a control unit for controlling an irradiation unit of an apparatus for producing a three-dimensional workpiece using an additive layer manufacturing technique, an apparatus for producing a three-dimensional workpiece using an additive layer manufacturing technique and a method for controlling an irradiation beam of an apparatus for producing a three-dimensional workpiece using an additive layer manufacturing technique.

In additive layering methods, workpieces are produced layer-by-layer by generating a sequence of solidified and interconnected workpiece layers. These processes may be distinguished by the type of raw material and/or the way of solidifying said raw material in order to produce the workpiece.

For example, powder bed fusion is a kind of additive layering process by which pulverulent, in particular metallic and/or ceramic raw materials, can be processed to three-dimensional workpieces of complex shapes. To that end, a raw material powder layer is applied onto a carrier and subjected to, for example, laser radiation in a site selective manner in dependence on the desired geometry of the workpiece that is to be produced. The laser radiation penetrating into the powder layer causes heating and consequently melting or sintering of the raw material powder particles. Further raw material powder layers are then applied successively to the layer on the carrier that has already been subjected to laser treatment, until the workpiece has the desired shape and size. Selective laser melting or laser sintering can be used in particular for the production of prototypes, tools, replacement parts or medical prostheses, such as, for example, dental or orthopedic prostheses, on the basis of CAD data.

On the other hand, fused deposition modeling or material jetting represent different types of additive layering processes. In this case, non-solidified raw material is supplied to a type of printing head which deposits said material onto a carrier where it then solidifies.

Prior art in additive manufacturing can be found, for example, in DE 10 2016 120 244 A1, in which a laser beam is generated based on a target value, and in EP 3 170 593 A1, in which the gas flow rate is adjusted based on a gas flow rate measurement.

An important parameter of additive layer construction methods is the quality of the produced workpieces. As quality may be affected by various parameters, known solutions do not always achieve the desired quality.

Therefore, it is an object of the present invention in particular to improve quality of three-dimensional workpieces produced using an additive layer manufacturing technique.

The invention is set out in the independent claims. Preferred embodiments of the invention are outlined in the dependent claims.

In a first aspect according to the present disclosure, there is provided a system for use in an apparatus for producing a three-dimensional workpiece using an additive layer manufacturing technique, the system comprising: an irradiation unit configured to selectively irradiate an irradiation plane with an irradiation beam, and a control unit coupled to the irradiation unit and configured to control the irradiation unit to modulate, as a function of a local process parameter when producing the three-dimensional workpiece, a (local) irradiation beam property of the irradiation beam.

The irradiation unit may, in some examples, comprise an irradiation device (for example a laser or electron beam source) or a combination of an irradiation device and a scanning/beam steering device or unit.

Selectively irradiating the irradiation plane with an irradiation beam may relate to a location (i.e. spatial)-selective and/or a time-selective irradiation of the irradiation plane with the irradiation beam.

The local process parameter may be a process parameter at a particular location on and/or above the irradiation plane during the process of producing the three-dimensional workpiece. The local process parameter may hence be mapped to a location on and/or above the irradiation plane. The local process parameter may be determined by the control unit or another component of the apparatus to which the control unit is coupleable.

The local process parameter may relate to a parameter which may vary while the three-dimensional workpiece is being produced during the additive layer manufacturing process. The local process parameter may be time-dependent and/or location-dependent. For a particular location on the irradiation plane, the local process parameter may vary with time.

The local process parameter may not relate to a target value of a parameter, but a value of the local process parameter may instead adjust itself (automatically) during the additive layer manufacturing process. The local process parameter may thus be taken into account in-situ during the additive layer manufacturing process when modulating the irradiation beam property of the irradiation beam locally on the irradiation plane.

The local process parameter may be independent of a geometry of the three-dimensional workpiece to be produced using the additive layer manufacturing technique.

The irradiation beam property may then be modulated locally based on a (time-dependent) function of the local process parameter.

Generally, inhomogeneities may occur during the process for producing the three-dimensional workpiece, in particular across the irradiation plane, with respect to one or more process parameters. These inhomogeneities may lead to a locally different influence thereof on the interaction between the irradiation beam and the material from which the three-dimensional workpiece is to be produced. Fumes and/or other (for example particulate) emissions stemming from the process for producing the three-dimensional workpiece may therefore be influenced by these inhomogeneities differently depending on the location on and/or over the irradiation plane.

By controlling the irradiation unit to modulate, as a function of the local process parameter when producing the three-dimensional workpiece, a local irradiation beam property of the irradiation beam, the above-described inhomogeneities may be countered accordingly. As a result, homogeneous component qualities of the three-dimensional workpiece may be improved over the entire construction/irradiation plane, i.e. independently from the part or area of the irradiation plane in which the workpiece is produced.

In some examples of the system, the local process parameter comprises a local process gas property of a process gas used when producing the three-dimensional workpiece. Process gas may be used during the production of the three-dimensional workpiece from a process gas inlet to a process gas outlet of the apparatus for producing a three-dimensional workpiece in particular in order to remove fumes and/or other (for example particulate) emissions stemming from the process for producing the three-dimensional workpiece using the additive layer manufacturing technique. The process gas property of the process gas at a particular location over the irradiation plane is therefore taken into account when controlling the irradiation unit to modulate the irradiation beam property of the irradiation beam. Inhomogeneities of the process gas property across the irradiation plane may therefore be countered, resulting in improved quality and in particular homogeneity of the three-dimensional workpiece. Fumes and/or other (particulate) emissions, from which the irradiation beam may scatter (which could result in inhomogeneous production of the three-dimensional workpiece) or which could attenuate the irradiation beam or change the irradiation beam profile, may be removed prior to performing a further/next irradiation step/event.

In some examples, the local process gas property comprises a local process gas flow velocity and/or a local process gas flow uniformity. Process gas flow uniformity may be measured/defined, for example, via the density of vortices. Additionally or alternatively, the local process gas property may comprise a (local) process gas temperature of the process gas.

The local process gas flow velocity and/or the local process gas flow uniformity may be measured, in some examples, with a (small) probe, which may measure the velocity of the gas flow zone by zone in some examples substantially perpendicular to the gas flow, so that a map of the gas flow over the entire area (of the irradiation plane) may be obtained. The probe may, in some examples, need to be smaller than a threshold size so that its influence on the gas flow may be negligible. Additionally or alternatively, computational fluid dynamics (CFD) simulations may be used in order to obtain the map of the gas flow over the entire area (of the irradiation plane). In some examples, CFD simulations are used for comparison with measurements taken with the probe.

With respect to the process gas flow velocity, generally, the velocity may decrease in the direction of movement of the process gas. In some examples, the velocity of the process gas at or within the vicinity (for example within a few cm, such as 5 cm) of the process gas inlet may be significantly higher, for example by a factor of 2, 5, 10 or 20, compared to the velocity of the process gas at or within the vicinity (for example within a few cm, such as 5 cm) of the process gas outlet. As a result, fumes and/or other (for example particulate) emissions stemming from the process for producing the three-dimensional workpiece may also be dissipated from the process gas inlet to the process gas outlet at continuously decreasing speed. The irradiation beam may be scattered by such emissions, so that in the interaction zone between the irradiation beam and the material from which the three-dimensional workpiece is to be produced, the intensity of the irradiation beam is attenuated or changed in the beam profile. This may then be taken into account when controlling, by the control unit, the irradiation unit to modulate, in this example as a function of the process gas flow velocity, the irradiation beam property of the irradiation beam. Homogeneity of the three-dimensional workpiece is thereby further improved.

In some examples of the system, the irradiation beam property comprises an irradiation beam energy input intensity during interaction of the irradiation beam with material (for example powder) from which the three-dimensional workpiece is to be produced. This may be particularly advantageous in examples in which the irradiation beam profile is changed, due to inhomogeneities, depending on the location at which the irradiation beam impinges on the irradiation plane. The energy input intensity of the irradiation beam may in particular be adjusted by controlling, by the control unit, the irradiation unit as a function of the local process gas flow velocity and/or local process gas flow uniformity, which influences fumes and/or other (for example particulate) emissions being dissipated with, for example, different dissipation speed depending on the location over the irradiation plane. This allows for improving homogeneity of the three-dimensional workpiece to be produced.

In some examples of the system, the irradiation beam property comprises a temporal spacing between two consecutive irradiation events of said selective irradiation of the irradiation plane with the irradiation beam. The two consecutive irradiation events may, for example, relate to two consecutive beam bursts and/or consecutive irradiation events according to irradiation vectors which are defined on the irradiation plane. Effects of a first irradiation event on a second irradiation event may hence be taken into account during production of the three-dimensional workpiece. This may be particularly advantageous as fumes and/or other particulate emissions stemming from the first irradiation event may be considered when determining when to perform the second irradiation event. For example, the temporal spacing between two consecutive irradiation events may be above a predefined threshold so that effects of the first irradiation event on the second irradiation event may be minimized. In some examples, fumes and/or other particulate emissions stemming from the first irradiation event may be prevented from having any influence on the second irradiation event or such influence may be minimized.

In some examples of the system, the irradiation beam property comprises one or more of (i) an irradiation beam power, (ii) an irradiation beam scan velocity when scanning the irradiation beam across the irradiation plane, and (iii) an irradiation beam focusing. In some examples, the irradiation beam property or properties to be modulated may depend on one or more properties of one or more irradiation events, such as, but not limited to the amount of fumes and/or other particulate emissions originating from an irradiation event. It is to be noted that too high irradiation beam (for example laser) power may lead, for example, to increased evaporation of material (keyhole welding and/or increased emissions), while too low irradiation beam (for example laser) power may lead, for example, to an increase in porosity due to lack-of-fusion, with remaining parameters being kept constant. Too high a scanning speed may also lead to lack-of-fusion (melt break), while too low a scanning speed may lead to keyhole welding and/or increased emissions. Keyholes, as is the case with lack-of-fusion, may leave behind porosities, which may reduce the density of the workpiece and may negatively influence other mechanical properties of the workpiece. Incorrect focus positions may (primarily) lead to lack-of-fusion, since, for example, defocusing may result in the spot diameter exceeding permissible tolerances and thus the energy per area may decrease.

In some examples, the system is configured to divide the irradiation plane into a plurality of zones, and wherein the control unit is configured to control the irradiation unit to modulate the irradiation beam property based on which one of the zones is irradiated by the irradiation beam. This may be particularly advantageous as the local process parameter, which may be determined before and/or during production of the three-dimensional workpiece, may be dependent on the particular zone on and/or above the irradiation plane. For example, a local process gas property may be known or determined based on the geometry of the process gas inlet and process gas outlet as well as, in some examples, the geometry of other parts of the apparatus for producing the three-dimensional workpiece. The process gas flow velocity may be lower in a zone which is closer to the process gas outlet compared to a zone which is further away from the process gas outlet (i.e. closer to the process gas inlet). In some examples, modulating the irradiation beam property based on the location of the zones may already be predefined prior to producing the three-dimensional workpiece using the additive layer manufacturing technique, in particular when the local process parameter, such as, but not limited to the process gas flow velocity and/or uniformity is simulated prior to producing the three-dimensional workpiece. Additionally or alternatively, online modulation of the irradiation beam property during production of the three-dimensional workpiece may be performed.

Dividing the irradiation plane into a plurality of zones may simplify as to how the irradiation beam property may be modulated when producing the three-dimensional workpiece.

In some examples of the system, the control unit is configured to control the irradiation unit to vary a time interval between two consecutive irradiation events based on a spatial distance of a said zone to a process gas inlet and/or process gas outlet of the apparatus. The closer the zone is to the process gas outlet, the more the time interval may be increased. This may advantageously allow for any fumes and/or particulate emissions to be removed prior to performing further irradiation events, while taking into account that said removal takes longer per spatial distance the closer the zone is to the process gas outlet.

In some examples, the system further comprises a process gas measuring device coupled to the control unit and configured to determine a process gas flow velocity distribution and/or a process gas flow uniformity distribution across the irradiation plane, wherein the system is configured to divide the irradiation plane into the plurality of zones based on the process gas flow velocity distribution and/or the process gas flow uniformity distribution. In some examples, one or more flow meters (probes) may be used in order to determine the process gas flow velocity distribution and/or the process gas flow uniformity distribution across the irradiation plane. Additionally or alternatively, the process gas flow velocity distribution and/or the process gas flow uniformity distribution across the irradiation plane may be simulated and the simulated result may be used as an input when determining as to how the irradiation beam property of the irradiation beam is to be modulated during production of the three-dimensional workpiece.

In some examples of the system, the control unit is configured to control the irradiation unit to modulate the irradiation beam property before and/or after scanning the irradiation beam across the irradiation plane based on a predefined number of scanning vectors. For example, a zone by zone influence of delay times for irradiation before and/or after each scanning vector, every second scanning vector etc. up to every N-th scanning vector from the process gas inlet to the process gas outlet may be used. In some examples, the system is configured to assign a said scanning vector to a said zone, such that modulation of the irradiation beam property may be based on scanning a particular scanning vector. For example, given that the scanning vector is in a particular zone, once the scanning vector has been scanned with the irradiation beam, a next scanning event (in the same zone and/or a neighboring zone and/or another zone) may be performed only after a predefined period has elapsed.

In some examples, the system further comprises a thermal radiation measuring unit coupled to the control unit and configured to measure a local thermal radiation on and/or over the irradiation plane during production of the three-dimensional workpiece, and wherein the control unit is configured to control the irradiation unit to modulate the irradiation beam property based on the local thermal radiation. Real-time data may be used when controlling the irradiation unit to modulate the irradiation beam property based on the local thermal radiation. A high(er) (for example above a threshold) local thermal radiation may, in some examples, be correlated with said location being irradiated by an irradiation beam, such that fumes and/or other particulate emissions may occur where thermal radiation is higher compared to another location. Using a thermal radiation measuring unit therefore allows for providing a further input when modulating the irradiation beam so as to further improve homogeneity of the three-dimensional workpiece to be produced.

In some examples, the thermal radiation measuring unit may be an on-axis (i.e. the field of view of the thermal radiation measuring unit towards the irradiation plane may coincide and/or be parallel with respect to the irradiation beam path of the irradiation beam) thermal radiation measuring unit. Additionally or alternatively, the thermal radiation measuring unit may be an off-axis (i.e. the field of view of the thermal radiation measuring unit towards the irradiation plane does not coincide with the irradiation beam path of the irradiation beam) thermal radiation measuring unit. Additionally or alternatively, the thermal radiation measuring unit may be an off-axis thermal radiation measuring unit, i.e. off-axis with respect to the irradiation beam path of the irradiation beam, whereby the field of view of the off-axis thermal radiation measuring unit towards the irradiation plane coincides with the irradiation beam path of the irradiation beam. In some examples, the (off-axis) thermal radiation measuring unit comprises an infrared camera which can, for example, be calibrated in the x-y-plane (i.e. parallel to the irradiation plane).

In some examples, (local) thermal radiation (emission), which may be detected online (i.e. live), may additionally or alternatively be used for online determination of delay times (for irradiation). If a signal of the thermal radiation deviates too much (for example by more than a predefined threshold) from a specified value and/or progression (profile) of previously measured thermal radiation, the control unit may dynamically adjust subsequent delay times and/or maintain and/or dynamically adjust delay times until the value and/or progression has returned to a "normal" value and/or progression which deviate(s) from the specified value and/or progression by less than the predefined threshold.

Together with the creation of the gas flow map, an associated thermal emission (radiation) map may be created, resulting from a blank substrate (plate) under idealized conditions without material (for example powder) from which the workpiece is to be produced. In some examples, from such a thermal map, the above-mentioned values may be derived.

In some examples, the system comprises a first said irradiation unit configured to selectively irradiate the irradiation plane with a first said irradiation beam and a second said irradiation unit configured to selectively irradiate the irradiation plane with a second said irradiation beam, and wherein the control unit is configured to control the first irradiation unit and/or the second irradiation unit to modulate the irradiation beam property of the first irradiation beam and/or the second irradiation beam based on a time-dependent spatial relationship of the first irradiation beam and the second irradiation beam with respect to each other during said production of the three-dimensional workpiece. This may allow in particular for precautionary individual adjustment of the delay times when irradiating the irradiation plane with the first irradiation beam and/or the second irradiation beam so as to further improve homogeneity of the three-dimensional workpiece to be produced. This may be particularly advantageous when irradiating neighboring zones or regions of the irradiation plane.

We further describe a control unit for controlling an irradiation unit of an apparatus for producing a three-dimensional workpiece using an additive layer manufacturing technique, wherein the control unit comprises: an input configured to receive data relating to a local process parameter during production of the three-dimensional workpiece, a processor configured to process said data to generate control data for controlling the irradiation unit, and an output coupleable to the irradiation unit and configured to output the generated control data to the irradiation unit for controlling the irradiation unit.

Preferred implementations of the system as outlined above are equally applicable to the control unit for controlling the irradiation unit of the apparatus for producing the three-dimensional workpiece using the additive layer manufacturing technique.

In particular, the local process parameter may comprise a local process gas property of a process gas used when producing the three-dimensional workpiece, particularly wherein the local process gas property comprises a local process gas flow velocity and/or a local process gas flow uniformity.

The irradiation beam property may comprise an irradiation beam energy input intensity during interaction of the irradiation beam with material from which the three-dimensional workpiece is to be produced.

The irradiation beam property may comprise a temporal spacing between two consecutive irradiation events of said selective irradiation of the irradiation plane with the irradiation beam.

The irradiation beam property may comprise one or more of (i) an irradiation beam power, (ii) an irradiation beam scan velocity when scanning the irradiation beam across the irradiation plane, and (iii) an irradiation beam focusing.

The control unit may be configured to divide the irradiation plane into a plurality of zones, and wherein the control unit is configured to control the irradiation unit to modulate the irradiation beam property based on which one of the zones is irradiated by the irradiation beam.

The control unit may be coupled or coupleable to a process gas measuring device which may be configured to determine a process gas flow velocity distribution and/or a process gas flow uniformity distribution across the irradiation plane, wherein the control unit is configured to divide the irradiation plane into the plurality of zones based on the process gas flow velocity distribution and/or the process gas flow uniformity distribution.

The control unit may be configured to control the irradiation unit to modulate the irradiation beam property before and/or after scanning the irradiation beam across the irradiation plane based on a predefined number of scanning vectors, in particular wherein the control unit is configured to assign a said scanning vector to a said zone.

The control unit may be coupled to a thermal radiation measuring unit which may be configured to measure a local thermal radiation on and/or over the irradiation plane during production of the three-dimensional workpiece, and wherein the control unit is configured to control the irradiation unit to modulate the irradiation beam property based on the local thermal radiation.

The control unit may be configured to control first and/or second irradiation units to modulate the irradiation beam property of a first irradiation beam and/or a second irradiation beam based on a time-dependent spatial relationship of the first irradiation beam and the second irradiation beam with respect to each other during said production of the three-dimensional workpiece.

We further describe an apparatus for producing a three-dimensional workpiece using an additive layer manufacturing technique, wherein the apparatus comprises a system and/or a control unit according to one or more of the example implementations as described throughout the present disclosure.

We further describe a method for controlling an irradiation beam of an apparatus for producing a three-dimensional workpiece using an additive layer manufacturing technique, the method comprising: determining a local process parameter during production of the three-dimensional workpiece using the additive layer manufacturing technique, and controlling the irradiation beam as a function of the determined local process parameter.

Preferred example implementations of the system and/or the control unit and/or the apparatus as outlined above are equally applicable to the method for controlling the irradiation beam of the apparatus for producing the three-dimensional workpiece using the additive layer manufacturing technique.

These and other aspects of the invention will now be further described, by way of example only, with reference to the accompanying figures, in which.

Selective-laser melting systems generally use different devices to generate a gas flow from a gas inlet to a gas outlet. Regardless of the type of device, the velocity of the gas flow decreases along its direction of movement. For example, the gas flow velocity may have a value directly at the inflow that is 10 times or more greater than the value of the flow velocity at the outlet. This may lead, among other things, to welding fumes and other particulate emissions also being dissipated from the gas inlet to the gas outlet at decreasing speed.

The laser beam/electron (or other particle) beam may be scattered by such emissions, so that in the interaction zone between energy beam and powder material the intensity of the irradiation may be attenuated or changed in the beam profile.

The possibilities for increasing the gas flow velocity may be limited.

The problem of too long a residence time of an emission cloud/fume at, around or above the interaction zone is, according to example implementations as described throughout the present disclosure, to give such emissions more time to be removed, in particular depending on where emission clouds/fumes originate. Examples according to the present disclosure make use of, in particular, zone by zone extension of the removal time of particulate emissions from the gas inlet to the gas outlet.

Given inhomogeneities in particular of the gas flow within the process chamber and in particular above the construction platform may lead to locally different strong influence of the irradiation (for example laser) material (for example powder) interaction zone by welding fumes and other emissions located above the respective area. This is countered by modulating the energy input intensity in the irradiation (laser)-material (powder) interaction as a function of, in some examples, the locally specific gas flow characteristics (which may, in some examples, relate mainly to velocity and uniformity).

According to the present disclosure, the modulation of the energy input intensity is to be done primarily, in some examples, by varying the spatial and/or temporal distances between two exposures, and/or by varying the irradiation (for example laser) power, and/or the scanning speed and/or beam focusing.

Example implementations according to the present disclosure allow for improving homogeneous component qualities over the entire construction platform in additive layer manufacturing. This may be particularly advantageous when creation of a perfectly homogeneous gas flow over the entire construction platform, especially in the case of larger construction spaces, may reach economically and technically sensible limits.

Figure 1:
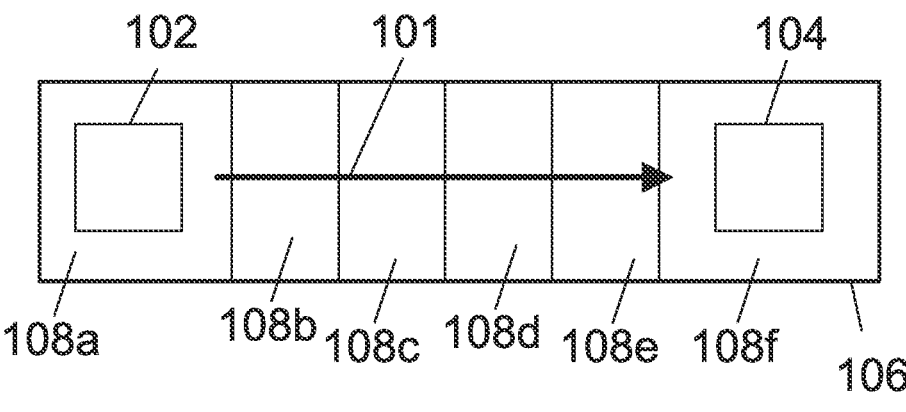
FIG. 1 shows a top view of a schematic illustration of components of an apparatus according to some example implementations as described herein.

FIG. 1 shows a top view of a schematic illustration of components of an apparatus according to some example implementations as described herein.

The apparatus comprises a process gas inlet 102 and a process gas outlet 104. Process gas flow, as depicted in FIG. 1 via the arrow 101, may be generated from the process gas inlet 102 to the process gas outlet 104.

In this example, the irradiation plane 106 is divided into a plurality of zones 108a-f. Zone by zone influence of delay times before and/or after each scanning vector, every second scanning vector etc. up to every N-th scanning vector from the process gas inlet 102 to the process gas outlet 104 is used. The control cards of the used scanners (not shown) may already use such delays in order to compensate, for example, for the drag delay of the scanners, usually in the acceleration and deceleration phases for each vector to be exposed.

The irradiation plane 106 is, in this example, divided into six zones 108a-f. It will be appreciated that the irradiation plane 106 may be divided into another number of zones.

The zones may, for example, be simple stripes whose length is perpendicular to the direction of gas flow, e.g. in the y-direction, as in the present example depicted in FIG. 1.

Other possible forms are, for example, sickle-shaped stripes or stripes whose shape results from measurements of the gas flow velocity over the entire construction area, i.e. based on a gas flow map.

Based on the set of two-dimensional vector information, the scanning vectors are then assigned to the corresponding zones with respect to their known x- and y-coordinates and provided with a pause time between consecutive irradiation events, as described above.

The gas flow map can also be used to create more complex classification rules, which may differ considerably from the simple stripes.

Figure 2:
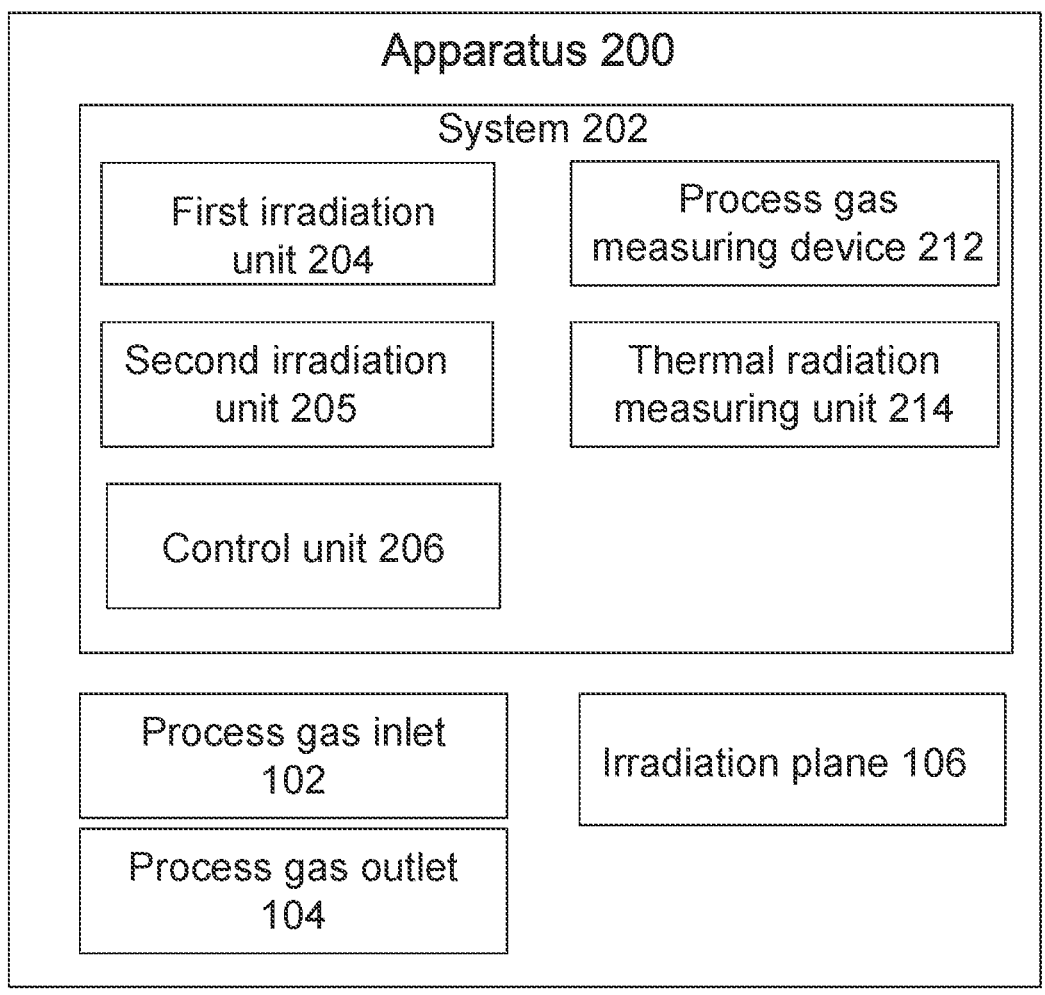
FIG. 2 shows a schematic block diagram of an apparatus according some example implementations as described herein.

FIG. 2 shows a schematic block diagram of an apparatus 200 for producing a three-dimensional workpiece using an additive layer manufacturing technique according some example implementations as described herein.

In this example, the apparatus 200 comprises a system 202 comprising a first irradiation unit 204 and a second irradiation unit 205 which are configured to selectively irradiate the irradiation plane 106 with a first irradiation beam and a second irradiation beam, respectively.

The system 202 comprises a control unit 206 coupled to the first irradiation unit 204 and the second irradiation unit 205, wherein the control unit 206 is configured to control the irradiation unit 204 and the irradiation unit 205 to modulate, as a function of a local process parameter when producing the three-dimensional workpiece, an irradiation beam property of the first irradiation beam and/or the second irradiation beam.

In this example, the system 202 further comprises a process gas measuring device 212 coupled to the control unit 206 and configured to determine a process gas flow velocity distribution and/or a process gas flow uniformity distribution across the irradiation plane 106, wherein the system 202 is configured to divide the irradiation plane 106 into the plurality of zones based on the process gas flow velocity distribution and/or the process gas flow uniformity distribution. Based on dividing the radiation plane 106 into the plurality of zones, the irradiation beam property may be modulated accordingly. In particular, delay times for irradiating the irradiation plane with an irradiation beam may be increased for zones in which the process gas flow velocity is lower, thereby allowing any fumes and/or particulate emissions to be removed by the process gas prior to continuing with a next irradiation step/event/scanning vector.

In this example, the system 202 further comprises a thermal radiation measuring unit 214 coupled to the control unit 206 and configured to measure a local thermal radiation on and/or over the irradiation plane 106 during production of the three-dimensional workpiece, and wherein the control unit 206 is configured to control the irradiation units 204 and/or 205 to modulate the irradiation beam property of the respective irradiation beam(s) based on the local thermal radiation. The local thermal radiation may indicate an area in which a scanning event takes place or has just taken place. In particular, a higher thermal radiation may be correlated with a scanning event. Areas in which the thermal radiation is relatively high may, in some examples, be used by the control unit 206 in order to control the first irradiation unit 204 and/or the second irradiation unit 205 to not irradiate the same area or neighboring areas at least for a predefined threshold period.

The apparatus 200 comprises the process gas inlet 102 and the process gas outlet 104 in order to control the process gas flow from the process gas inlet 102 to the process gas outlet 104.

In addition, the values of the delay times can be calculated on the basis of real-time evaluations of melt pool monitoring signals which are signals relating to the area in which material is irradiated to produce the three-dimensional workpiece. If one knows where the respective scanners/irradiation units are located to each other in time and place with respect to the corresponding irradiation beams, then, depending on the distance in space and time, a precautionary individual adjustment of the delay times can be made. Based on melt pool monitoring reference measurements using at least two irradiation units, which in adjacent regions (e.g. zones) cause a solidification of material (for example powder) to a solid, melt pool monitoring signal changes with respect to welding fumes, spatter and other emissions from the material-irradiation beam (for example powder-laser) interaction area are used to individually adjust the delay values in the respective zones online. One aspect of the present disclosure is therefore also to make this possible, a setting according to distance in space and time as an additional or alternative form of execution to that in zones.

Figure 3:
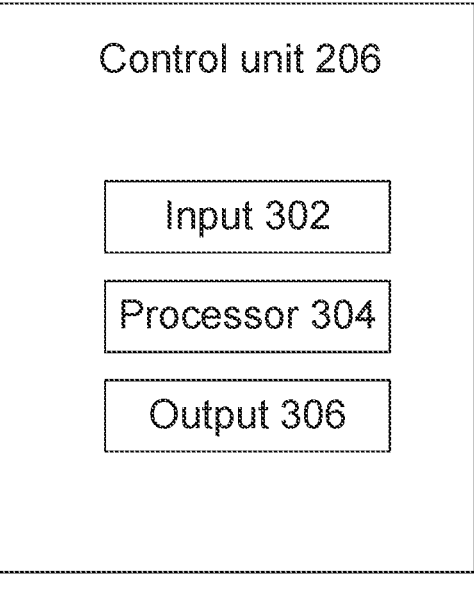
FIG. 3 shows a schematic block diagram of a control unit according to some example implementations as described herein.

FIG. 3 shows a schematic block diagram of a control unit 206 according to some example implementations as described herein.

In this example, the control unit 206 comprises an input 302 configured to receive data relating to a local process parameter during production of the three-dimensional workpiece, a processor 304 configured to process said data to generate control data for controlling the irradiation unit, and an output 306 coupleable to the irradiation unit and configured to output the generated control data to the irradiation unit for controlling the irradiation unit. Data relating to the local process parameter during production of the three-dimensional workpiece may be obtained, i.e. generated by the control unit 206 itself, or may be obtained from another component of the apparatus for producing the three-dimensional workpiece.

Figure 4:
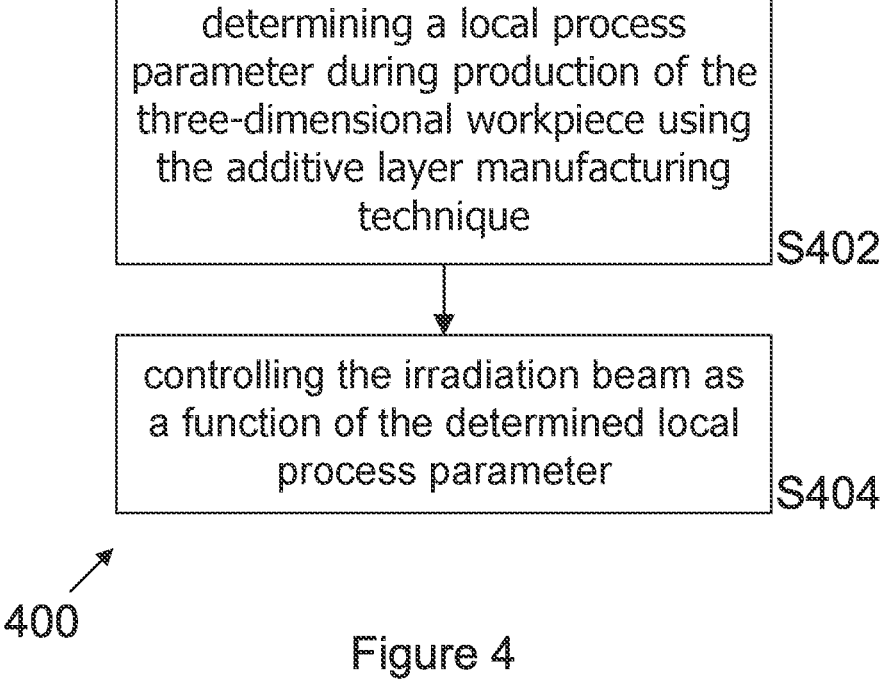
FIG. 4 shows a flow diagram of a method according to some example implementations as described herein.

FIG. 4 shows a flow diagram of a method 400 according to some example implementations as described herein.

The method 400 comprises, at step S402, determining a local process parameter during production of the three-dimensional workpiece using the additive layer manufacturing technique, and, at step S404, controlling the irradiation beam as a function of the determined local process parameter.

The system, apparatus, control unit and method according to example implementations as described herein advantageously allow for improving homogeneity of the produced three-dimensional workpiece, while being adaptable to different systems having, for example, different geometries.

No doubt many other effective alternatives will occur to the skilled person. It will be understood that the invention is not limited to the described embodiments and example implementations and encompasses modifications apparent to those skilled in the art and lying within the scope of the claims appended hereto.

The invention claimed is:

1. A system for use in an apparatus for producing a three-dimensional workpiece using an additive layer manufacturing technique, the system comprising:
    an irradiation unit configured to selectively irradiate an irradiation plane with an irradiation beam, and
    a control unit coupled to the irradiation unit and configured to control the irradiation unit to modulate, as a function of a local process parameter when producing the three-dimensional workpiece, an irradiation beam property of the irradiation beam, wherein the local process parameter at a particular location on and/or above the irradiation plane is independent of a geometry of the three-dimensional workpiece to be produced and varies in time and/or location when producing the three-dimensional workpiece, wherein the system is configured to divide the irradiation plane into a plurality of zones, and wherein the control unit is configured to control the irradiation unit to modulate the irradiation beam property based on which one of the zones is irradiated by the irradiation beam, and wherein the control unit is configured to control the irradiation unit to vary a time interval between two consecutive irradiation events based on a spatial distance of a said zone to a process gas inlet and/or process gas outlet of the apparatus, wherein the time interval is varied such that the closer the zone is to the process gas outlet, the more the time interval is increased.

2. A system as claimed in claim 1, wherein the local process parameter comprises a local process gas property of a process gas used when producing the three-dimensional workpiece.

3. A system as claimed in claim 2, wherein the local process gas property comprises a local process gas flow velocity and/or a local process gas flow uniformity.

4. A system as claimed in claim 1, wherein the irradiation beam property comprises an irradiation beam energy input intensity during interaction of the irradiation beam with material from which the three-dimensional work-piece is to be produced.

5. A system as claimed in claim 1, wherein the irradiation beam property comprises a temporal spacing between two consecutive irradiation events of said selective irradiation of the irradiation plane with the irradiation beam.

6. A system as claimed in claim 1, wherein the irradiation beam property comprises one or more of (i) an irradiation beam power, (ii) an irradiation beam scan velocity when scanning the irradiation beam across the irradiation plane, and (iii) an irradiation beam focusing.

7. A system as claimed in claim 1, further comprising a process gas measuring device coupled to the control unit and configured to determine a process gas flow velocity distribution and/or a process gas flow uniformity distribution across the irradiation plane, wherein the system is configured to divide the irradiation plane into the plurality of zones based on the process gas flow velocity distribution and/or the process gas flow uniformity distribution.

8. A system as claimed in claim 1, wherein the control unit is configured to control the irradiation unit to modulate the irradiation beam property before and/or after scanning the irradiation beam across the irradiation plane based on a predefined number of scanning vectors.

9. A system as claimed in claim 8, wherein the system is configured to divide the irradiation plane into a plurality of zones, and wherein the control unit is configured to control the irradiation unit to modulate, the irradiation beam property based on which one of the zones is irradiated by the irradiation beam, wherein the system further comprises a process gas measuring device coupled to the control unit and configured to determine a process gas flow velocity distribution and/or a process gas flow uniformity distribution across the irradiation plane, wherein the system is configured to divide the irradiation plane into the plurality of zones based on the process gas flow velocity distribution and/or the process gas flow uniformity distribution, wherein the system is configured to assign a said scanning vector to a said zone.

10. A system as claimed in claim 1, further comprising a thermal radiation measuring unit coupled to the control unit and configured to measure a local thermal radiation on and/or over the irradiation plane during production of the three-dimensional workpiece, and wherein the control unit is configured to control the irradiation unit to modulate the irradiation beam property based on the local thermal radiation.

11. A system as claimed in claim 1, wherein the system comprises a first said irradiation unit configured to selectively irradiate the irradiation plane with a first said irradiation beam and a second said irradiation unit configured to selectively irradiate the irradiation plane with a second said irradiation beam, and wherein the control unit is configured to control the first irradiation unit and/or the second irradiation unit to modulate the irradiation beam properly of the first irradiation beam and/or the second irradiation beam based on a time-dependent spatial relationship of the first irradiation beam and the second irradiation beam with respect to each other during said production of the three-dimensional workpiece.

12. A control unit for controlling an irradiation unit of an apparatus configured to selectively irradiate an irradiation plane with an irradiation beam for producing a three-dimensional workpiece using an additive layer manufacturing technique, wherein the control unit comprises:

an input configured to receive data relating to a local process parameter during production of the three-dimensional workpiece, wherein the local process parameter at a particular location on and/or above the irradiation plane is independent of a geometry of the three-dimensional workpiece to be produced and varies in time and/or location when producing the three-dimensional workpiece, a processor configured to process said data to generate control data for controlling the irradiation unit, and an output couplable to the irradiation unit and configured to output the generated control data to the irradiation unit for controlling the irradiation unit to modulate an irradiation beam property of the irradiation beam, wherein the system is configured to divide the irradiation plane into a plurality of zones, and wherein the control unit is configured to control the irradiation unit to modulate the irradiation beam property based on which one of the zones is irradiated by the irradiation beam, and wherein the control unit is configured to control the irradiation unit to vary a time interval between two consecutive irradiation events based on a spatial distance of a said zone to a process gas inlet and/or process gas outlet of the apparatus, wherein the time interval is varied such that the closer the zone is to the process gas outlet, the more the time interval is increased.

13. A method for controlling an irradiation beam of an apparatus for producing a three-dimensional workpiece using an additive layer manufacturing technique, the apparatus being configured to selectively irradiate an irradiation plane with the irradiation beam, the method comprising:

determining a local process parameter during production of the three-dimensional workpiece using the additive layer manufacturing technique, wherein the local process parameter at a particular location on and/or above the irradiation plane is independent of a geometry of the three-dimensional workpiece to be produced and varies in time and/or location when producing the three-dimensional workpiece, controlling the irradiation beam as a function of the determined local process parameter so as to modulate an irradiation beam property of the irradiation beam, dividing the irradiation plane into a plurality of zones, and controlling the irradiation unit to modulate the irradiation beam property based on which one of the zones is irradiated by the irradiation beam, and varying a time interval between two consecutive irradiation events based on a spatial distance of a said zone to a process gas inlet and/or process gas outlet of the apparatus, wherein the time interval is varied such that the closer the zone is to the process gas outlet, the more the time interval is increased.

* * * * *